United States Patent [19]

Achelpohl et al.

[11] 4,115,183

[45] Sep. 19, 1978

[54] APPARATUS FOR MAKING BAGS FROM A TWO-PLY WEB OF THERMOPLASTIC MATERIAL

[75] Inventors: Fritz Achelpohl; Friedhelm Mundus, both of Lengerich, Fed. Rep. of Germany

[73] Assignee: Windmoller & Holscher, Lengerich, Fed. Rep. of Germany

[21] Appl. No.: 816,033

[22] Filed: Jul. 15, 1977

[30] Foreign Application Priority Data

Jul. 21, 1976 [DE] Fed. Rep. of Germany ....... 2632853

[51] Int. Cl.[2] ........................ B32B 31/00; B30B 15/34

[52] U.S. Cl. .................................... 156/515; 152/583

[58] Field of Search ................................ 156/515, 583

[56] References Cited

U.S. PATENT DOCUMENTS 3,838,631 10/1974 Simpson .............................. 156/515

3,971,299 7/1976 Whittle ................................ 156/515

FOREIGN PATENT DOCUMENTS 241,925 7/1960 Australia ................................. 156/515

1,054,644 1/1967 United Kingdom ..................... 156/515

*Primary Examiner*—Douglas J. Drummond

*Attorney, Agent, or Firm*—Fleit & Jacobson

[57] ABSTRACT

An apparatus for making bags from a continuously fed heat-sealable web comprises supporting bars for the web arranged on a rotary cylinder parallel to and at a spacing from one another. Means for transversely welding and separating the web comprise welding bars co-operating with backing bars. The backing bars are arranged between the supporting bars and are displaceable towards the welding bars. The supporting and backing bars are movable towards and away from one another in a zig-zag line during transference of the web passed therebetween. The supporting bars for receiving and holding the web are axially extensible and retractable at least over the width of the web. In the region of the cylinder sector in which the supporting bars are retracted and the separating weld seams are produced, the welding bars are guided to be concentric with the cylindrical enveloping surface swept by the backing bars, namely outside said enveloping surface and at the same angular speed.

14 Claims, 12 Drawing Figures

APPARATUS FOR MAKING BAGS FROM A TWO-PLY WEB OF THERMOPLASTIC MATERIAL

The invention relates to an apparatus for making bags or tube sections from a two-ply web of heat-sealable or weldable material, comprising bars for supporting the continuously supplied web, which supporting bars are arranged on a rotary cylinder parallel to and at a spacing from one another and between which backing bars of transverse welding and separating means are arranged for displacement towards welding bars cooperating therewith, the supporting and backing bars being movable towards and away from one another in a zig-zag line with transference of the web passed therebetween, and means for taking away the bags formed by the separating weld seams.

In an apparatus of this kind known from Offenlegungsschrift No. 2,353,885 and 2,353,887, both published May 9, 1974, the welding bars consist of the surfaces of a closed heated wall of an internally disposed drum. The welding drum is enclosed by a cage formed by the supporting bars which concentrically surround same, are parallel to one another and are arranged at a spacing to the surfaces of the drum. The backing bars are arranged in a cylindrical frame of larger diameter surrounding the welding drum and the supporting bar cage to point towards the welding drum, the rotary axis of the frame being eccentric to the rotary axis of the welding drum so that the backing bars engage between the supporting bars over only part of the circumference of the welding drum and press the web against the heated wall of the welding drum to produce the separating weld seam. The web is offered substantially axially in the region between the supporting bars and backing bars at which the backing bars turning at the same peripheral speed are furthest removed from the supporting bars by reason of the eccentricity of the rotary axes. In this region there is a deflecting bar which deflects the supplied web from its substantially axial direction to the peripheral direction.

The known apparatus not only has the disadvantage that means for deflecting the web to the peripheral direction must be provided between the rotating supporting bars and backing bars, which involves additional expense and takes up a large space particularly when wide webs are being processed, but the welding drum and the means enclosed by the frame carrying the backing bars are also accessible with difficulty and therefore cumbersome to maintain, which could result in long standstill periods in the case of break-down.

It is therefore an object of the invention to provide an apparatus of the aforementioned kind which has a high performance and is simple in construction and readily accessible for maintenance.

This object is fulfilled according to the invention in that the supporting bars for receiving and holding the web are axially extensible and retractable at least over the width of the web and the welding bars are, at least in the region of the cylinder sector in which the supporting bars are retracted and the separating weld seams are produced, guided to be concentric with the cylindrical enveloping surface swept by the backing bars, outside same and at the same angular speed. The apparatus of the invention consists of only a single cylinder which is formed by two side plates and in which the supporting bars as well as the backing bars are mounted. The controls for the backing bars and supporting bars can be brought about by simple cam plates and cams.

The web to be made into bags or tube sections is, after retraction of the supporting bars, longitudinally placed on the backing bars, and the supporting bars are then again pushed in to the position at which they cover the web.

For the zig-zag formation, the supporting bars are moved towards the cylinder axis so that the web is folded to lie in concertina fashion over the backing bars on the one hand and over the supporting bars on the other hand. The bags or tube sections are made by executing the transverse welds between the backing bars and the welding bars. The apparatus of the invention having only a single cylinder is compact and all parts of the apparatus are readily accessible for maintenance.

Preferably, holding bars for clamping the finished bags between each other are provided parallel to and radially inwardly of the supporting bars for movement together therewith.

The supporting bars are desirably loosely rotatably mounted to permit the zig-zag formation with the least possible friction. For the same reason, loosely rotatable rollers having surfaces disposed in the region of the enveloping cylinder described by the backing bars may be provided on both sides of the backing bars, parallel thereto and enclosing same. For the zig-zag formation, the supporting bars may be mounted for displacement radially towards and away from the cylinder axis.

Preferably, the supporting bars are divided into parts of substantially equal length which are movable by cams. This achieves short paths for the first bars.

In a further development of the invention, the supporting bars are mounted in levers pivotable by cams radially to the shaft of the side plates. The supporting bars can thereby be moved in a simple manner towards the holding bars so that the finished bags can be clamped between the two bars.

In a further development of the invention, the bars are mounted in guide members which are displaceable by cam plates radially to the shaft of the side plates so that the desired movement of the bars can be selected at will.

Preferably, welding bars which are mounted on chains passing over sprockets are provided in a zone defined by first radius vectors to be tangential to the welding cylinder formed by the side plates and the backing bars, whereby the welding bars can be readily checked and maintained.

The backing bars may be mounted in guide members displaceable radially outwardly by cam rings in the region of the first radius vectors so that the backing bars come to lie against the welding bars and intimate contact is achieved during welding.

The backing bars may, in a second region adjoining the region defined by first radius vectors, be radially outwardly displaceable to a further extent by the cam rings. In this way one achieves positive separation of the transversely welded bags.

One of the cam plates displacing the bars in the radial direction may be replaceable. This enables any desired bag width to be produced.

A double belt guide may be provided on the welding cylinder, the lower belt being tangential to the enveloping cylinder defined by the first bars and the double belt guide moving more slowly than the welding cylinder.

This unfolds the bags folded about the supporting bars and transfers them in a flattened condition for depositing purposes.

An example of the invention is illustrated in the drawing and will now be described in more detail. In the drawing.

Figure 1:
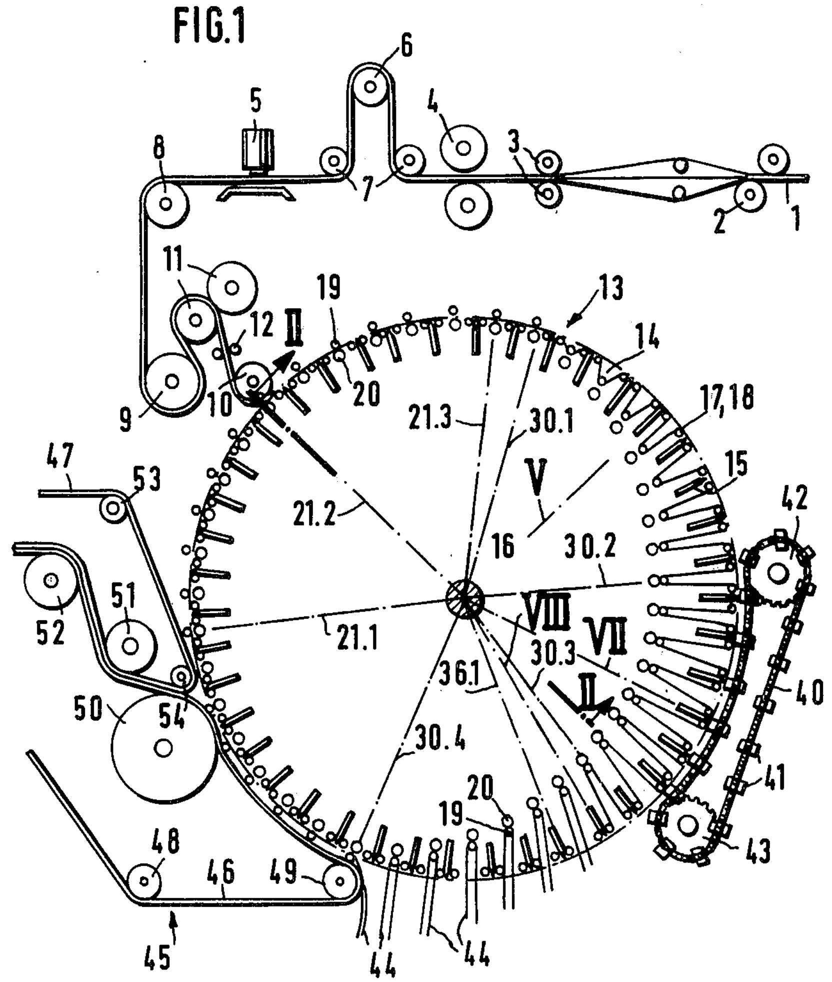
FIG. 1 is a front elevation of the apparatus.
Figure 2:
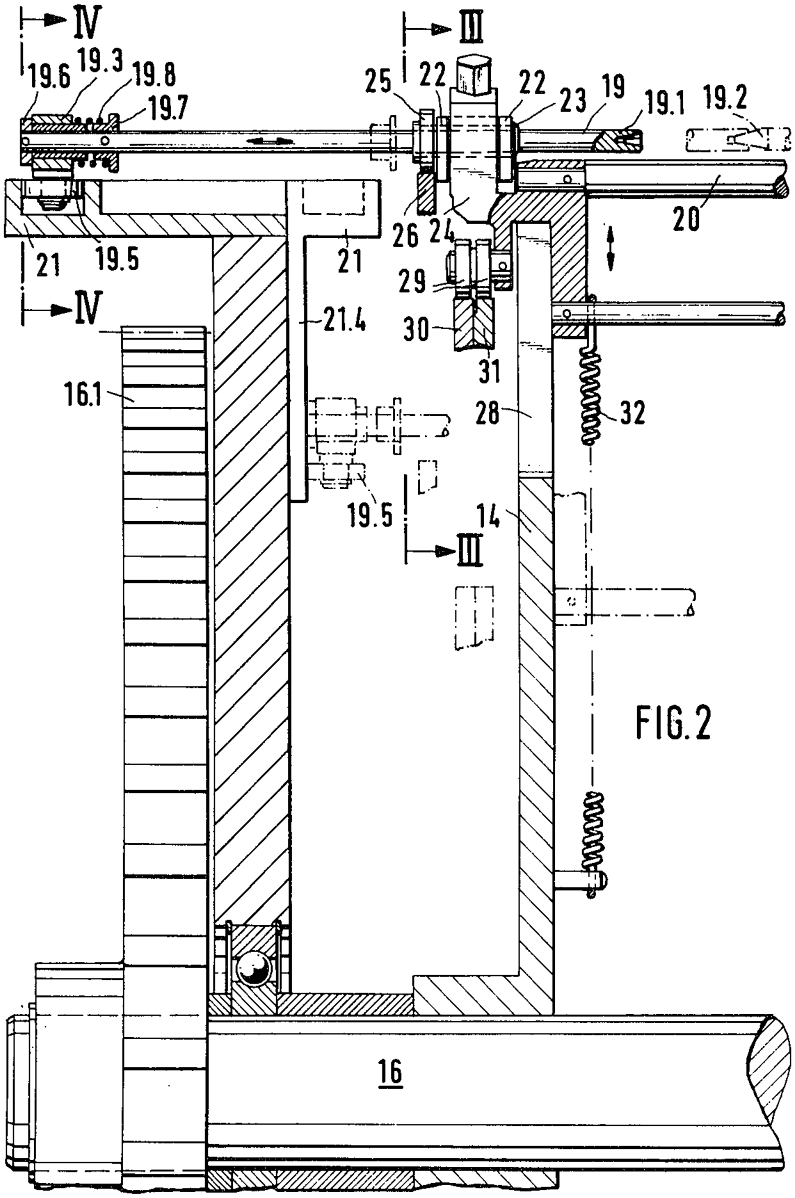
FIG. 2 is a section on the line II—II in FIG. 1.
Figure 3:
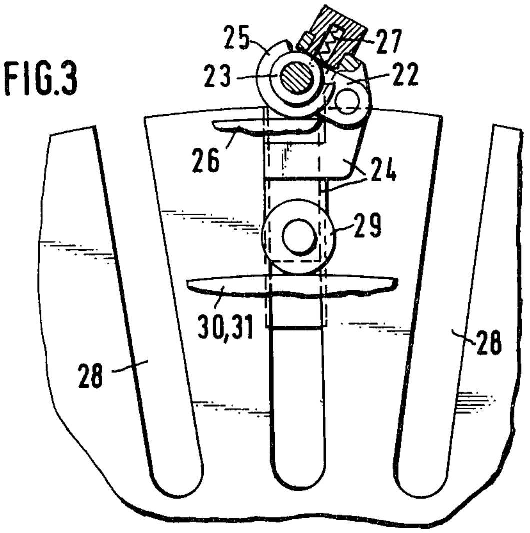
FIG. 3 is a section on the line II—II in FIG. 2.

A web 1 of plastic film is withdrawn from a supply reel (not shown) and folded to form a semi-tube. A base fold is formed in the semi-tube between a guide roller 2 and a pair of tensioning rollers 3. By means of a rotary stamping device 4, handle holes are stamped out of the bag to be formed. A photocell 5 is directed onto a printed marking on the web 1 of film. By means of the photocell, one controls the desired withdrawn length of the web 1 with the aid of a regulator (not shown). The regulating bridge formed by a floating roller 6 and two guide rollers 7 controls the correct position of the handle aperture in relation to the bag to be formed. The web 1 passes over further guide rollers 8, 9 and 10 and is withdrawn by a pair of feed rollers 11. Ionisation rods 12 are provided between the guide roller 10 and the pair of feed rollers 11 to eliminate electrostatic charging of the web 1. The guide roller 10 is tangential to a welding cylinder 13 consisting of two side plates 14 between which backing bars 15 are mounted for displacement in the radial direction. The side plates 14 are secured to a shaft 16 which is loosely rotatable in the frame of the machine and they are continuously driven by a gear 16.1 connected to the shaft 16. On both sides adjacent the backing bars 15, shafts 17 are arranged in the side plates 14. Over the entire length of these shafts, small rollers 18 are loosely rotatably mounted with their surfaces tangential to the enveloping circle of the backing bars 15.

Bars 19, 20 associated in pairs are provided on the bisector of the angle included between every two backing bars 15. These bars 19, 20 lie on a common radius vector extending from the shaft 16, the bars 20 being on the smaller radius.

Figure 4:
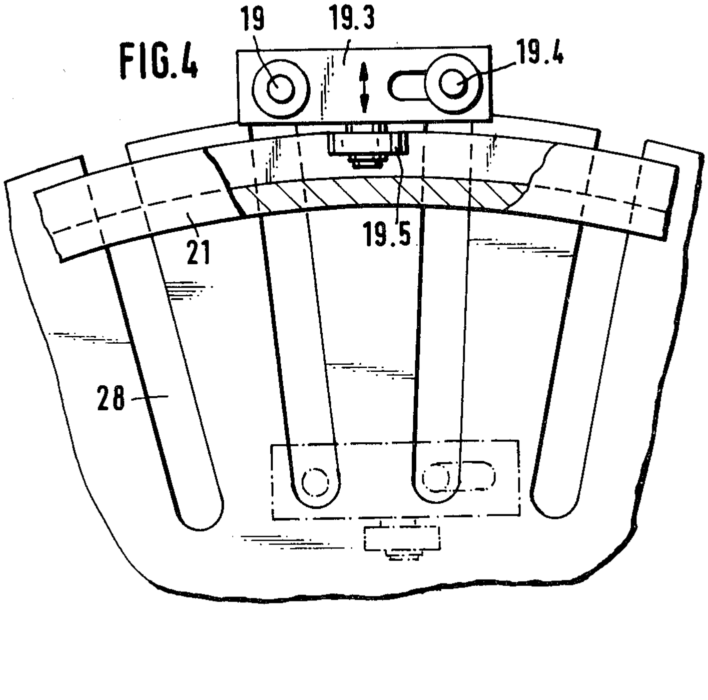
FIG. 4 is a section on the line IV—IV in FIG. 2.
Figure 5:
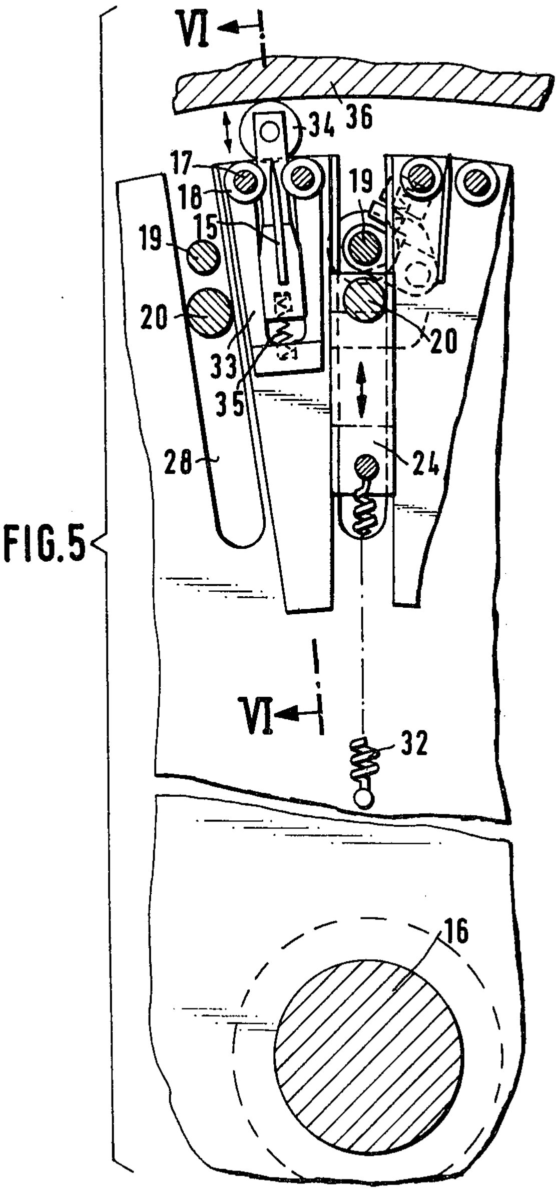
FIG. 5 is an enlarged representation at the radius vector V in FIG. 1.
Figure 6:
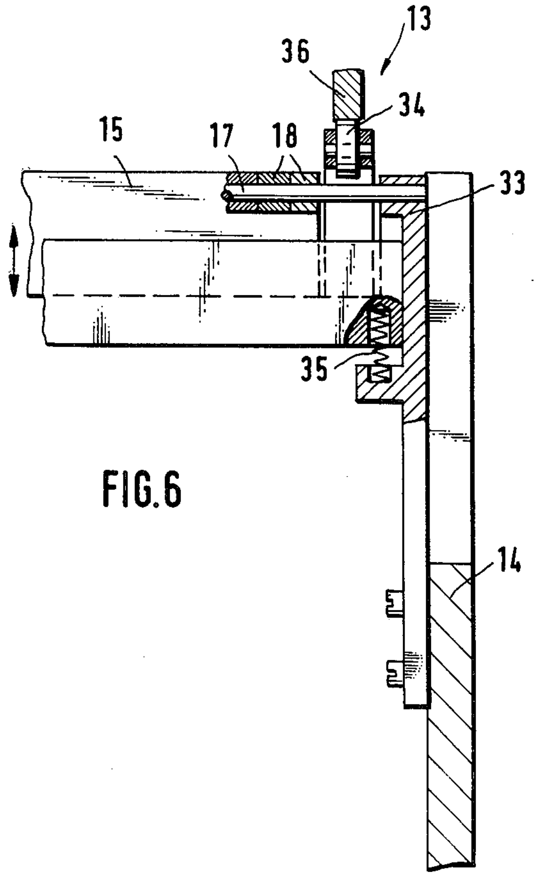
FIG. 6 is a section on the line VI—VI in FIG. 5.

The bars 19 are sub-divided into substantially equal sections, the one section 19.1 being longitudinally displaceable in the left-hand plate 14 and the other section 19.2 in the right-hand plate 14. The bar sections are loosely rotatable about themselves and can be displaced outwardly from the centre and back to their starting position by means of fixed cams 21 which are provided one on each side of the frame and are formed as mirror images to one another. The cams 21 are in the form of grooves and extend from the radius vector 21.1 to the radius vector 21.3. At the position 21.2, they have their maximum deflection. The radius vector 21.2 substantially meets the point at which the guide roller 10 is tangential to the welding cylinder 13. At the radius vector 21.1, the two sections 19.1 and 19.2 of the bars 19 are therefore moved axially outwardly so that the web 1 arriving over the guide roller 10 can be placed on the bars 20 or the rollers 18. The bar sections 19.1 and 19.2 are thereupon brought together and make contact at the radius vector 21.3. Their ends are in the form of points and internal cones, respectively, so that in the contacting condition the points project into the internal cones and the two bar sections are flush with one another and in alignment. The bars 19 are mounted in pairs in guide members 19.3 for displacement in their longitudinal direction, one of the bars, for example 19.4, also being displaceable towards the other bar, which is designated 19 in FIG. 4. Loosely rotatably secured to the guide members 19.3 there are cam rollers 19.5 which run in the cam grooves 21 between the radius vectors 21.1 and 21.3. Abutments 19.6 are secured to the outer ends of the bars 19 and guide sleeves 19.7 are secured to the part of the bars 19 that points to the centre of the machine.

Between the guide members 19.3 and the guide sleeves 19.7 there are compression springs 19.8 which ensure that the abutments 19.6 lie flush against the guide members 19.3 or the bar sections 19.1 and 19.2 lie flush with their points in the internal cones. The bars 19 are mounted in guide sleeves 23 or in levers 22 which are pivoted in guide members 24. One lever 22 is provided on each broad side. Rollers 25 moving on fixed cams 26 are loosely rotatably mounted on the guide sleeves 23. Compression springs 27 are provided on the guide members 24 and these act on the guide sleeves 23 and press the rollers 25 onto the cams 26. The cams 26 are formed so that the bars 19 have a somewhat larger radial spacing between the radius vectors 21.1 and 21.3 than elsewhere so that they will not make contact with the web 1 of film when the bars are inserted.

The guide members 24 are guided in slots 28 of the side plates 14. A plate is connected to each oppositely disposed guide member 24. Each guide member 24 comprises two rollers 29 which roll on fixed cam plates 30, 31 and is connected to a tension spring 32 which presses the rollers 29 onto the cam plates 30, 31 and the other end of which is secured to the respective plate 14. The cam plates 30, 31 have, between the radius vectors 30.1 and 30.2, a progressively smaller radial spacing compared with the substantially circular remaining peripheral portion and they reach a substantially circular shape between the radius vectors 30.2 and 30.3.

Between the radius vectors 30.3 and 30.4, their radius increases again and has a maximum value at 30.4. Corresponding to the shape of the cam plates 30, 31, the bars 19, 20 move inwardly during rotation of the side plates 14 so that the web 1 is laid in zig-zag shape over the backing bars 15 by means of the bars 19. The web 1 is continuously pulled along over the bars 20 or rollers 18 until the maximum zig-zag shape has been reached. Between the radius vectors 21.3 and 21.1, the rollers 19.5 do not move in the cam grooves 21 but on two surfaces 21.4 which are provided on the frame and extend perpendicular to the shaft 16, so that the bar sections 19.1 and 19.2 continue to be held securely together.

The backing bars 15 are radially displaceable in guide members 33 which are provided on both sides between the slots 28 of the plates 14 and are securely connected to the plates 14. The guide members 33 comprise loosely rotatably mounted cam rollers 34. These are pressed against cam rings 36 with internal cam surfaces by means of compression springs 35 disposed between the backing bars 15 and the side plates 14.

Tangential to the welding cylinder 13 there are welding bars 41 which are mounted on chains 40, the chains 40 running over sprockets 42, 43 in synchronism with the welding cylinder 13, at least one of the chains being driven in a suitable manner (not shown).

Figure 7:
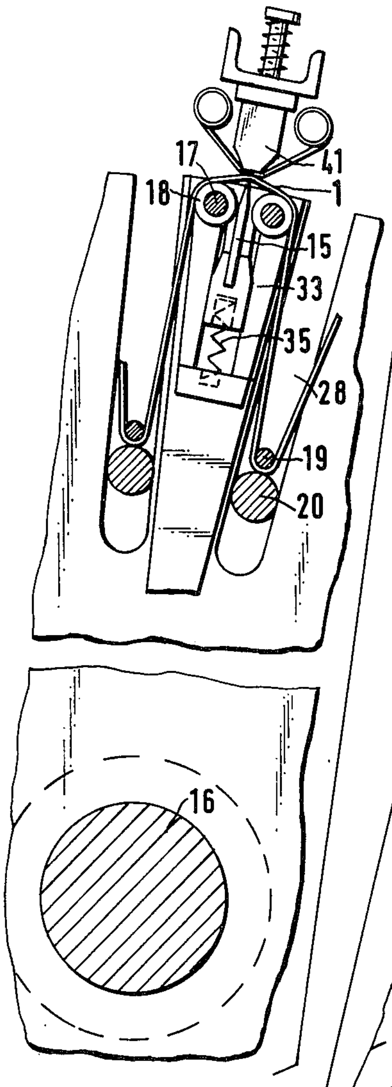
FIG. 7 is an enlarged elevation at the radius vector VII in FIG. 1.
Figure 8:
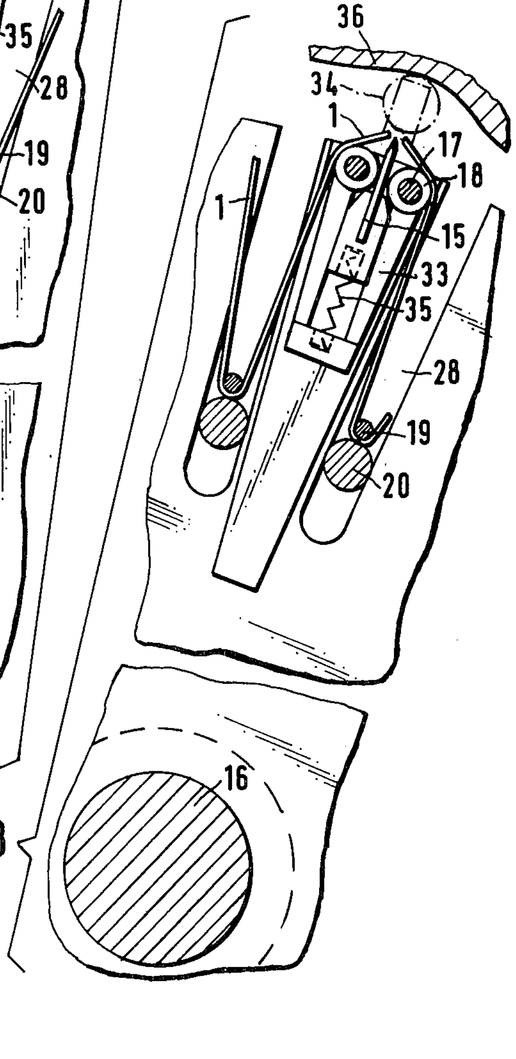
FIG. 8 is an enlarged elevation at the radius vector VIII in FIG. 1.
Figure 10:
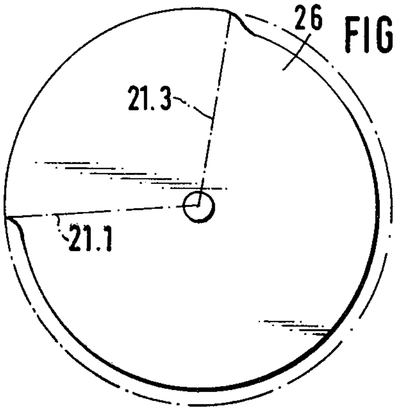
FIGS. 9 to 12 show constructions of the control cams.
Figure 11:
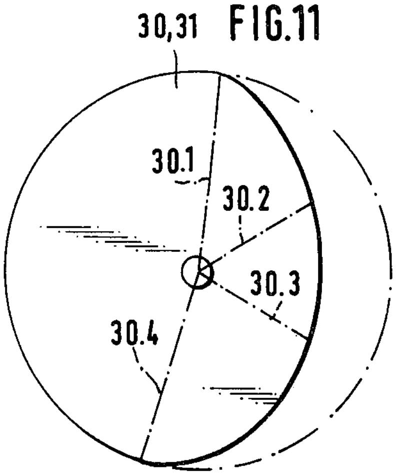
Figure 9:
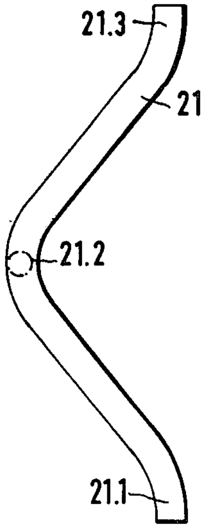
Figure 12:
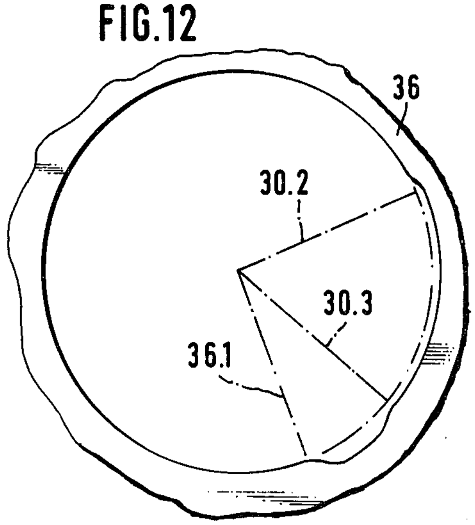

In the region between the radius vectors 30.2 and 30.3, the cam rings 36 have larger radii so that the backing bars 15 project beyond the enveloping curve of the welding cylinder 13 and come to lie against the welding bars 41 as shown in FIG. 7 and the transverse seam in the web 1 is produced accurately. In the adjoining region between the radius vectors 30.3 and 36.1, the radii of the cam rings 36 are still larger so that the projecting backing bars will positively sever the separating weld seams and produce individual bags 44 which are held by the bars 19, 20. These bags are brought outside the enveloping curve of the welding cylinder 13 by means of the radial movement of the bars 19, 20 executed by them by reason of the shape of the cam plates 30, 31 and they arrive at a double belt guide 45 which is provided at the periphery of the welding cylinder 13 substantially between the radius vectors 30.4 and 21.1 and are moved more slowly than the welding cylinder 13 and of which the lower belt 46 passes over rollers 48 to 52 and the upper belt 47 passes over rollers 53, 54 and the rollers 51, 52. The finished product is deposited by means of the double belt guide 45. The bars 19 which are loosely rotatable as already described, roll on the lower belt 46 or the one half of the bags 44 folded about the bars 19 so that the bags 44 unfold in the course of movement along the lower belts 46 and are introduced between the mouth of the lower and upper belts 46, 47 in a flattened, unfolded condition and are deposited. The cam plates 31 are replaceable and extend over a region bounded by the radius vectors 30.1 and 30.4. If bags 44 of narrower widths are to be produced, a cam plate 31 with a larger radius in the region 30.2 and 30.3 is inserted, whereby zig-zag folds of shallower depth are produced and the finished bags 44 will have a narrower width.

We claim:

1. Apparatus for making bags or tube sections from a continuously supplied two-ply web of heat-sealable or weldable material, comprising a rotary cylinder mounted for rotation about an axis; supporting bars (19) for supporting the continuously supplied web positioned at spaced intervals on said rotary cylinder, said supporting bars being radially spaced from the axis of said rotary cylinder, movable towards and away from the periphery of said rotary cylinder, movable towards and away from the periphery of said rotary cylinder, and axially movable between an open position and a blocking position, the supplied web being positionable radially inward of said supporting bars when said supporting bars are in said open position, said supporting bars being movable to said blocking position to retain said supplied web in said radially inward position; transverse welding and separating means for welding the web and for separating the welded web to form bags and comprising backing bars (15) and welding bars (41) cooperating therewith, said backing bars being positioned on said rotary cylinder between said supporting bars and being displaceable towards and away from said welding bars, the supplied web being positionable radially outward of said backing bars, said supporting and backing bars being movable away from each other so that the supplied web follows a zig-zag path; and means for taking away the bags formed by the transverse welding and separating means, a first region being defined adjacent said rotary cylinder by a sector defined by radius vectors (30.2, 30.3) of the rotary cylinder, said supporting bars being moved away from the backing bars and the web being welded during rotation of said rotary cylinder through said first region, a first cylinder enveloping surface being described by the rotation of said backing bars through said first region, said welding bars being positioned in said first region adjacent said rotary cylinder, being guided to be concentric with the first cylinder enveloping surface, and being adapted to be moved at the same rotational speed as the backing bars.

2. Apparatus according to claim 1, further comprising holding bars (20) provided on the rotary cylinder parallel to and radially inwardly of the supporting bars (19) for movement together therewith, the formed bags being clamped between the holding bars and the supporting bars.

3. Apparatus according to claim 2, wherein the rotary cylinder includes a shaft (16) and two spaced apart, parallel side plates (14) mounted on the shaft and wherein the apparatus further comprises cam plates (30, 31) and guide members (24) for mounting the supporting and holding bars (19, 20) for movement radially to the shaft (16).

4. Apparatus according to claim 3, wherein the cam plates (31) are adjustable for adaption of the apparatus to handle different width web material.

5. Apparatus according to claim 1, wherein the supporting bars are loosely rotatably mounted.

6. Apparatus according to claim 1, further comprising loosely rotatable rollers (18) positioned on both sides and parallel to the backing bars (15), the rollers having surfaces disposed in the region of the enveloping cylinder described by the backing bars (15).

7. Apparatus according to claim 1, wherein the supporting bars (19) are mounted for displacement radially towards and away from the cylinder axis.

8. Apparatus according to claim 1, further comprising cams (21) and wherein the supporting bars (19) are divided into parts (19.1, 19.2) of substantially equal length which are movable towards and away from each other by cams (21).

9. Apparatus according to claim 1, further comprising guide members (33) and cam rings (36), the backing bars (15) being mounted in the guide members (33) for radially outward displacement by the cam rings (36) in the first region so that the backing bars (15) come to lie against the welding bars (41).

10. Apparatus according to claim 9, wherein a second region adjoins the first region, the backing bars (15) in the second region being radially outwardly displaceable to a further extent by the cam rings.

11. Apparatus according to claim 1, wherein the rotary cylinder includes a shaft (16) and two spaced apart, parallel side plates (14) mounted on the shaft, and wherein the apparatus further comprises cams (26) and levers (22) operatively associated with the cams for mounting the supporting bars (19) for movement radially to the shaft (16).

12. Apparatus according to claim 11, wherein the rotary cylinder and the backing bars (15) define a welding cylinder (13) located in the first region, and wherein the apparatus further comprises sprockets (42, 43) positioned adjacent the welding cylinder and chains (40) passing over the sprockets, the chains mounting the welding bars (41).

13. Apparatus according to claim 1, wherein the supporting bars (19) define a second enveloping cylinder and wherein the apparatus further comprises a double belt guide (45) positioned adjacent the second enveloping cylinder and having a lower belt (46) tangential to the second enveloping cylinder and moving more slowly than the rotating speed of the rotary cylinder.

14. Apparatus for making bags or tube sections from a continuously supplied two-ply web of heat-sealable or weldable material, comprising:

a rotary cylinder mounted for rotation about an axis;

supporting bars arranged on said rotary cylinder parallel and at a spacing from one another for supporting the continuously supplied web, the supporting bars being movable towards and away from the periphery of the rotary cylinder and having portions displaceable from each other for a distance at least equal to the width of the continously supplied web, so that the web can be positioned between the supporting bars and the axis of the rotary cylinder;

movable backing bars arranged on said rotary cylinder between said supporting bars for supporting the continuously supplied web, the web being supplied to the apparatus in such manner that the backing bars are positioned between the axis of the rotary cylinder and the web, the backing bars combining with the supporting bars to define a zig-zag path for the web; and welding means for welding the web to form bags and positioned adjacent the rotary cylinder and cooperating with the backing bars to define a welding region, the supporting bars being movable toward the axis of the rotary cylinder during the rotation of the rotary cylinder through the welding region, the backing bars being movable away from the cylinder axis and including portions defining a cylindrical enveloping surface in the welding region, the welding means including rotatable welding bars positioned outside the enveloping surface, the welding bars having portions concentric with the enveloping surface and being rotatable at the same rotational speed as the portions of the backing bars defining the cylindrical enveloping surface, the backing bars being movable away from the cylinder axis to separate the welded web to form bags.

* * * * *